US009524628B1

(12) United States Patent
Omer et al.

(10) Patent No.: US 9,524,628 B1
(45) Date of Patent: Dec. 20, 2016

(54) DETECTING SIGNAL MODULATION FOR MOTION DETECTION

(71) Applicant: Cognitive Systems Corp., Waterloo (CA)

(72) Inventors: Mohammad Omer, Waterloo (CA); Stephen Arnold Devison, Waterloo (CA); Dustin Griesdorf, Waterloo (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

(21) Appl. No.: 15/228,418

(22) Filed: Aug. 4, 2016

(51) Int. Cl.
H04L 27/06 (2006.01)
G08B 13/24 (2006.01)
H04L 27/00 (2006.01)

(52) U.S. Cl.
CPC ....... *G08B 13/2491* (2013.01); *H04L 27/0012* (2013.01)

(58) Field of Classification Search
CPC ............. G08B 13/2491; H04L 27/0012; H04L 27/2649; H04L 27/2277; H04L 27/0061; H04L 1/0045
USPC .................................. 375/224, 316, 340, 342
See application file for complete search history.

(56) References Cited

U.S. PATENT DOCUMENTS

| 4,740,045 | A | 4/1988 | Goodson et al. |
|---|---|---|---|
| 5,270,720 | A | 12/1993 | Stove |
| 5,696,514 | A | 12/1997 | Nathanson et al. |
| 7,295,109 | B2 | 11/2007 | Kobayashi |
| 8,138,918 | B2 | 3/2012 | Habib et al. |
| 8,331,498 | B2 | 12/2012 | Huang et al. |
| 8,477,750 | B2 | 7/2013 | Agarwal et al. |
| 8,836,344 | B2 | 9/2014 | Habib et al. |
| 9,143,413 | B1 | 9/2015 | Manku et al. |
| 9,143,968 | B1 | 9/2015 | Manku et al. |
| 2005/0055568 | A1 | 3/2005 | Agrawala et al. |
| 2005/0083199 | A1 | 4/2005 | Hall et al. |
| 2008/0303655 | A1 | 12/2008 | Johnson |
| 2010/0315284 | A1 | 12/2010 | Trizna et al. |
| 2012/0146788 | A1 | 6/2012 | Wilson et al. |

(Continued)

FOREIGN PATENT DOCUMENTS

WO 2014201574 12/2014

OTHER PUBLICATIONS

Shpater (WO/2014/201574), filed on Jun. 23, 2014, published on Dec. 24, 2014.*

(Continued)

*Primary Examiner* — Siu Lee
(74) *Attorney, Agent, or Firm* — Henry Patent Law Firm PLLC

(57) ABSTRACT

In a general aspect, motion is detected based on wireless signals. In some aspects, a modulation type of a first signal is identified at a motion detector device. The first signal is based on a wireless signal transmitted through a space by a transmitter device and received by the motion detector device. A demodulator at the motion detector device generates a second signal from the first signal by demodulating the first signal according to the identified modulation type. A modulator at the motion detector device generates a third signal from the second signal by modulating the second signal according to the identified modulation type. A channel response is generated based on the first signal and the third signal. The channel response is used to detect motion of an object in the space.

26 Claims, 7 Drawing Sheets

(56) References Cited

U.S. PATENT DOCUMENTS

| | | |
|---|---|---|
| 2012/0184296 A1 | 7/2012 | Milosiu |
| 2014/0004874 A1 | 1/2014 | Schwartz et al. |
| 2014/0015706 A1 | 1/2014 | Ishihara et al. |
| 2014/0140231 A1 | 5/2014 | Haiut et al. |
| 2014/0247179 A1* | 9/2014 | Furuskog ............... G01S 13/003 342/28 |
| 2015/0212205 A1 | 7/2015 | Shpater |
| 2015/0338507 A1 | 11/2015 | Oh et al. |

OTHER PUBLICATIONS

Non-Final Office Action received in U.S. Appl. No. 15/099,833, Jun. 27, 2016, 16 pages.

Non-Final Office Action received in U.S. Appl. No. 15/151,571, Aug. 5, 2016, 18 pages.

\* cited by examiner

DETECTING SIGNAL MODULATION FOR MOTION DETECTION

BACKGROUND

The following description relates to motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DETAILED DESCRIPTION

Figure 1A:
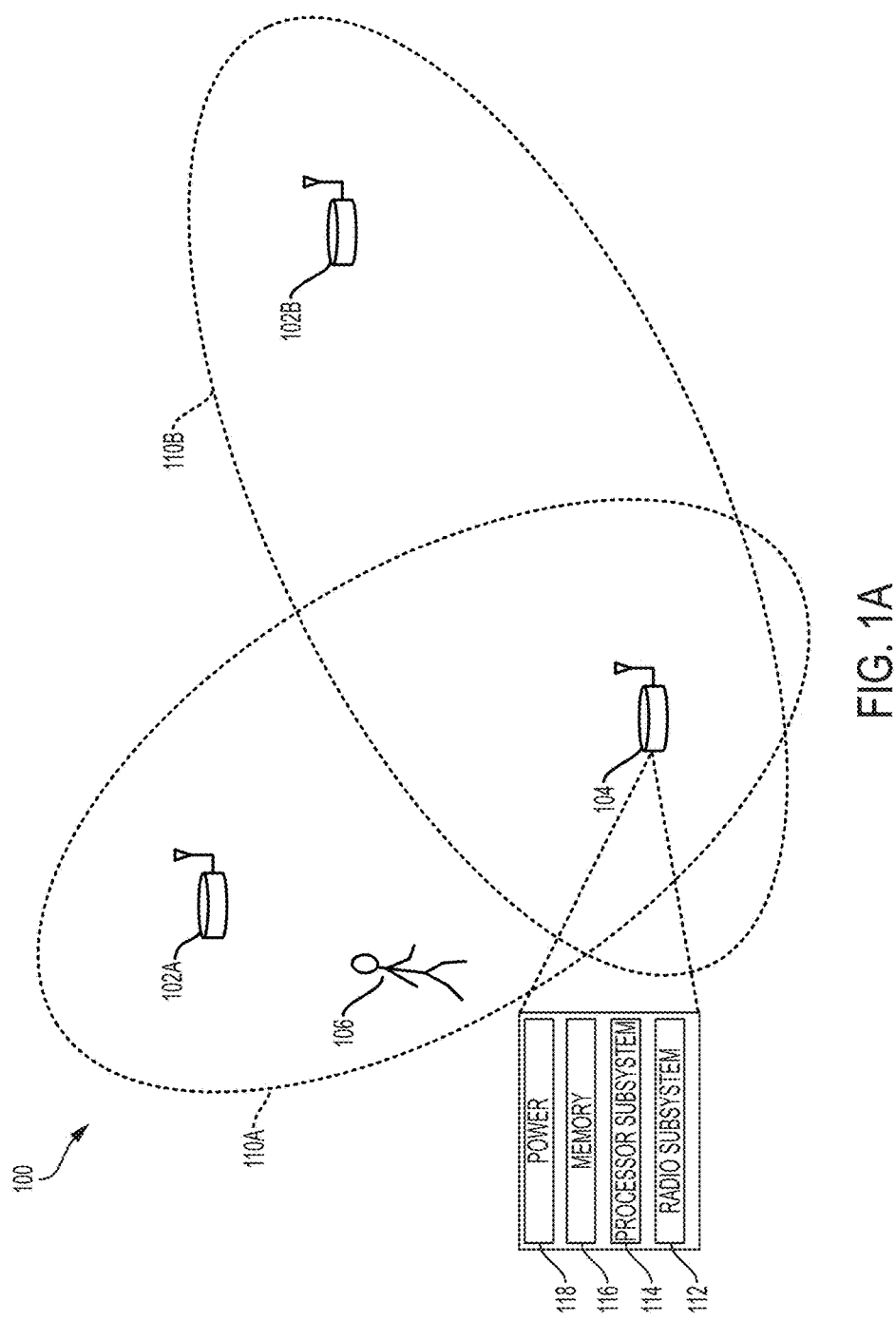
FIG. 1A is a diagram showing an example wireless communication system.

In some aspects of what is described here, a motion detector device can detect a type of signal modulation applied to a wireless signal, and process the wireless signal based on the type of signal modulation detected. In some instances, by processing the wireless signal, the motion detector device detects the motion of an object in a motion detection field. In some implementations, the motion detector device can be used in a multi-link, modulation-agnostic motion detection scheme that uses standard modulation bandwidths for communications. The motion detection scheme may include motion proximity detection and other features. In some cases, the motion detector device is included in an intrusion detection system (e.g., a security system), a wireless network system or another type of system infrastructure.

In some implementations, a wireless signal is used to probe a space for motion of objects in the space, for example, by identifying channel characteristics of the space. For instance, the wireless signal can be transmitted through the space and received by a motion detector device, and the motion detector device can process the received wireless signal to determine the channel response associated with the space. In some cases, the motion detection scheme can operate independent of the wireless transmission scheme, and therefore the motion detector device can detect motion based on a great multiplicity of wireless signals.

In some implementations, a motion detector device can process wireless signals transmitted according to any of multiple distinct transmission schemes. For instance, the wireless signals that are processed for motion detection may include signals transmitted using single carrier, spread spectrum, frequency division multiplexing (FDM) or another type of wireless transmission scheme. In some cases, the wireless signals used for motion detection are transmitted using orthogonal frequency-division multiplexing (OFDM). For example, the 802.11a and 802.11n standards developed by IEEE use OFDM-type signals that can be used for motion detection. Other standards that use OFDM-type signals, which may be used for motion detection in some cases, include DVB (Digital Video Broadcasting) TV standards, WiMAX (Worldwide Interoperability for Microwave Access) standards, WiMedia Alliance standards, and FLASH-OFDM standards. In some cases, the wireless signals used for motion detection are transmitted using direct sequence spread spectrum (DSSS). For example, the 802.11b and 802.11c standards developed by IEEE use DSSS-type signals that can be used for motion detection. Other standards that use DSSS-type signals, which may be used for motion detection in some cases, include 3G wireless standards, HSUPA (High-Speed Uplink Packet Access) standards and EV-DO (Evolution-Data Optimized) standards. Accordingly, a motion detector device may be configured to detect motion based on wireless signals transmitted using an OFDM transmission scheme and wireless signals transmitted using a DSSS transmission scheme. A motion detector device may be configured to detect motion based on other types of wireless signals in some cases.

In some implementations, a motion detector device receives wireless signals transmitted from a Wireless Access Point (WAP) device, and processes the received signals to detect motion. For instance, the WAP device can be a Wi-Fi access point that transmits signals according to a Wi-Fi standard. Pervasive Wi-Fi standards include both DSSS-based transmission schemes (e.g., 802.11b, 802.11c) OFDM-based transmission schemes (e.g., 802.11a, 802.11n). A motion detector device can be configured to work with both transmission schemes for sensitive motion detection. As an example, if a Wi-Fi access point is transmitting beacon signals using a DSSS modulation scheme, the motion detector device can use the beacon signals to detect motion; if the same Wi-Fi access point later begins transmitting 802.11n packets using an OFDM modulation scheme, the same motion detector device can then use the 802.11n packets to detect motion.

In some implementations, a motion detection scheme can detect motion by identifying changes in channel characteristics. In some cases, channel signatures are obtained using different waveforms, for instance, by correlating them with reference in the spectral domain. In some examples, a motion detection scheme receives multiple different waveforms, detects a type of modulation applied to each waveform, demodulates each waveform using the appropriate demodulation process, regenerates each waveform using the appropriate modulation process, and extracts a channel response for each waveform. As an example, the regenerated waveform and original waveform can be passed through a filter bank, and an adaptive filter can be used to estimate the channel coefficients in the frequency domain based on the filter bank output. In some cases, a dictionary of channel signatures can be created based on the relative distribution of power within the received spectrum and the noise floor. In some cases, various metrics can be extracted from a channel signature and translated to a motion indicator, a motion proximity indicator or a combination of these and other types of indicators. In some cases, spectral signatures are tracked in differentiated motion streams and activity metrics are extracted from each of the motion streams.

In some implementations, a motion detection scheme can provide granular information as to the proximity of the moving object relative to a particular wireless communication link, for example, for intrusion detection or other purposes. The proximity information can be used to detect a zone of a moving object, and potentially to triangulate the object's position based on the geometric configuration of multiple wireless communication links. In some cases, such location tracking is not constrained by the modulated bandwidth of the wireless signal.

FIG. 1A is a diagram showing an example wireless communication system 100. The example wireless communication system 100 includes three wireless devices—a first wireless access point 102A, a second wireless access point 102B and a motion detector device 104. The example wireless communication system 100 may include additional wireless devices and other components (e.g., additional motion detector devices, additional wireless access points, one or more network servers, network routers, network switches, cables or other communication links, etc.).

The example wireless access points 102A, 102B can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless access points 102A, 102B may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In the example shown in FIG. 1A, the wireless access points 102A, 102B can be, or they may include, standard wireless network components; for example a conventional Wi-Fi access point may be used in some cases. In some cases, another type of standard or conventional Wi-Fi transmitter device may be used. In some examples, the wireless access points 102A, 102B each include a modem and other components such as, for example, a power supply, a memory, and wired communication ports. In some implementations, the first wireless access point 102A and the second wireless access point 102B are the same type of device. In some implementations, the first wireless access point 102A and the second wireless access point 102B are two different types of devices (e.g., wireless access points for two different types of wireless networks, or two different types of wireless access points for the same wireless network).

The example motion detector device 104 includes a radio subsystem 112, a processor subsystem 114, a memory 116 and a power unit 118. The motion detector device 104 may include additional or different components. In some cases, the motion detector device 104 includes additional ports or communication interfaces or other features. In some implementations, the radio subsystem 112, the processor subsystem 114, the memory 116 and the power unit 118 are housed together in a common housing or other assembly. In some implementations, one or more of the components can be housed separately, for example, in a separate housing or other assembly.

In some implementations, the data processor subsystem 114 and the radio subsystem 112, or portions of them, are included in a modem of the motion detector device. For instance, the processor subsystem 114 may include a baseband processor that interfaces with the radio subsystem 112. The modem may include a baseband processor and radio components implemented on a common chip or chipset, or they may be implemented in a card or another type of assembled device. The modem may be configured to communicate (receive, transmit, or both) radio frequency signals formatted according to a wireless communication standard.

In some cases, the example radio subsystem 112 includes one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. In some examples, the radio subsystem 112 includes a radio chip and an RF front end. A radio subsystem may include additional or different components.

In some instances, the radio subsystem 112 in the example motion detector device 104 wirelessly receives radio frequency signals (e.g., through an antenna), down-converts the radio frequency signals to baseband signals, and sends the baseband signals to the processor subsystem 114. The signals exchanged between the radio subsystem 112 and the processor subsystem 114 may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem. In some implementations, the radio subsystem 112 produces in-phase and quadrature signals (I and Q signals), for example, in digital or analog format, based on received wireless signals.

In some cases, the processor subsystem 114 includes digital electronics configured to process digital baseband data. As an example, the processor subsystem 114 may include a baseband chip, a digital signal processor (DSP), a microprocessor or other types of data processing apparatus. In some cases, the processor subsystem 114 includes digital processing logic to operate the radio subsystem 112, to process wireless signals received through the radio subsystem 112, to detect motion based on signals received through the radio subsystem 112 or to perform other types of processes. The processor subsystem 114 may be configured to perform operations by executing instructions, for example, programs, codes, scripts or other types of instructions stored in memory, or instructions encoded in logic circuits, logic gates, or other types of hardware or firmware components.

The processor subsystem 114 may include one or more chips, chipsets, or other types of devices that are configured to process data encoded in signals from the radio subsystem (e.g., by decoding the signals according to a wireless communication standard, by processing the signals according to a motion detection process, or otherwise). For instance, the processor subsystem 114 may include hardware configured to process in-phase and quadrature signals (I and Q signals) from the radio subsystem 112 to extract data from received wireless signals. As an example, the processor subsystem 114 may include the components shown in FIG. 2A or other components configured to identify a channel response and noise vector. In some cases, the processor subsystem 114 includes one or more chips, chipsets, or other types of devices that are configured to analyze channel responses, noise data or other types of information for motion detection. For instance, the processor subsystem 114 may include hardware configured to perform one or more of the operations in the example process 250 shown in FIG. 2B or other operations related to motion detection.

The example memory 116 can include computer-readable media, for example, a volatile memory device, a non-volatile memory device, or both. The memory 116 can include one or more read-only memory devices, random-access memory devices, buffer memory devices, or a combination of these and other types of memory devices. In some instances, one or more components of the memory 116 can be integrated or otherwise associated with another component of the motion detector device 104.

The example power unit 118 provides power to the other components of the motion detector device 104. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., and AC adapter) that receives an external power signal (from an external source) and coverts the external power signal to an internal power signal conditioned for a component of the motion detector device 104. The power unit 118 may include other components or operate in another manner.

In the example shown in FIG. 1A, the wireless access points 102A, 102B transmit wireless signals according to a wireless network standard. For instance, wireless access points 102A, 102B may broadcast wireless signals (e.g., beacon signals, status signals, etc.), or they may send wireless signals addressed to other devices (e.g., a user equipment, a client device, a server, etc.), and the other devices (not shown) as well as the motion detector device 104 may receive the wireless signals transmitted by the wireless access points 102A, 102B. In some cases, the wireless signals transmitted by the wireless access points 102A, 102B are repeated periodically, for example, according to a wireless communication standard or otherwise.

In the example shown, the motion detector device 104 processes the wireless signals from the wireless access points 102A, 102B to detect motion in a space accessed by the wireless signals. For example, the motion detector device 104 may perform the example process 150 in FIG. 1B, the example process 250 in FIG. 2B or another type of process for detecting motion. The space accessed by the motion detection signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the motion detector device 104 can transmit wireless signals and the wireless access points 102A, 102B can processes the wireless signals from the motion detector device 104 to detect motion.

The wireless signals used for motion detection can include, for example, a beacon signal (e.g., Bluetooth Beacons, Wi-Fi Beacons, other wireless beacon signals) or another standard signal generated for other purposes according to a wireless network standard. In some examples, the wireless signals propagate through an object (e.g., a wall) before or after interacting with a moving object, which may allow the moving object's movement to be detected without an optical line-of-sight between the moving object and the transmission or receiving hardware. The motion detection data generated by the motion detector device 104 may be communicated to another device or system, such as a security system, that may include a control center for monitoring movement within a space, such as a room, building, outdoor area, etc.

In some implementations, the wireless access points 102A and 102B can be modified to include a separate transmission channel (e.g., a frequency channel or coded channel) that transmits signals with a header and a payload that the motion detector device 104 can use for motion sensing. For example, the modulation applied to the payload and the type of data or data structure in the payload may be known by the motion detector device 104, which may reduce the amount of processing that the motion detector device 104 performs for motion sensing. The header may include additional information such as, for example, an indication of whether motion was detected by another device in the communication system 100, an indication of the modulation type, etc.

In the example shown in FIG. 1A, the wireless communication link between the motion detector device 104 and the first wireless access point 102A can be used to probe a first motion detection field 110A, and the wireless communication link between the motion detector device 104 and the second wireless access point 102A can be used to probe a second motion detection field 110B. In some instances, when an object moves in the space accessed by the wireless signals, the motion detector device 104 detects the motion and identifies an approximate location or proximity of the motion. For instance, when a person 106 shown in FIG. 1A moves in the first motion detection field 110A, the motion detector device 104 may detect the motion based on the wireless signals transmitted by the first wireless access point 102A, and identify a location or proximity of the motion in relation to the locations of the motion detector device 104 and the first wireless access point 102A.

In some instances, the motion detection fields 110A, 110B can include, for example, air, solid materials, liquids or another medium through which wireless electromagnetic signals may propagate. In the example shown in FIG. 1A, the first motion detection field 110A provides a wireless communication channel between the first wireless access point 102A and the motion detector device 104, and the second motion detection field 110B provides a wireless communication channel between the second wireless access point 102B and the motion detector device 104. In some aspects of operation, wireless signals transferred through a wireless communication channel are used to detect movement of an object in the wireless communication channel. The objects can be any type of static or moveable object, and can be living or inanimate. For example, the object can be a person (e.g., the person 106 shown in FIG. 1A), an animal, an inorganic object (e.g., a system, device, apparatus or assembly), an object that defines all or part of the boundary of a space (e.g., a wall, door, window, etc.), or another type of object.

Figure 2A:
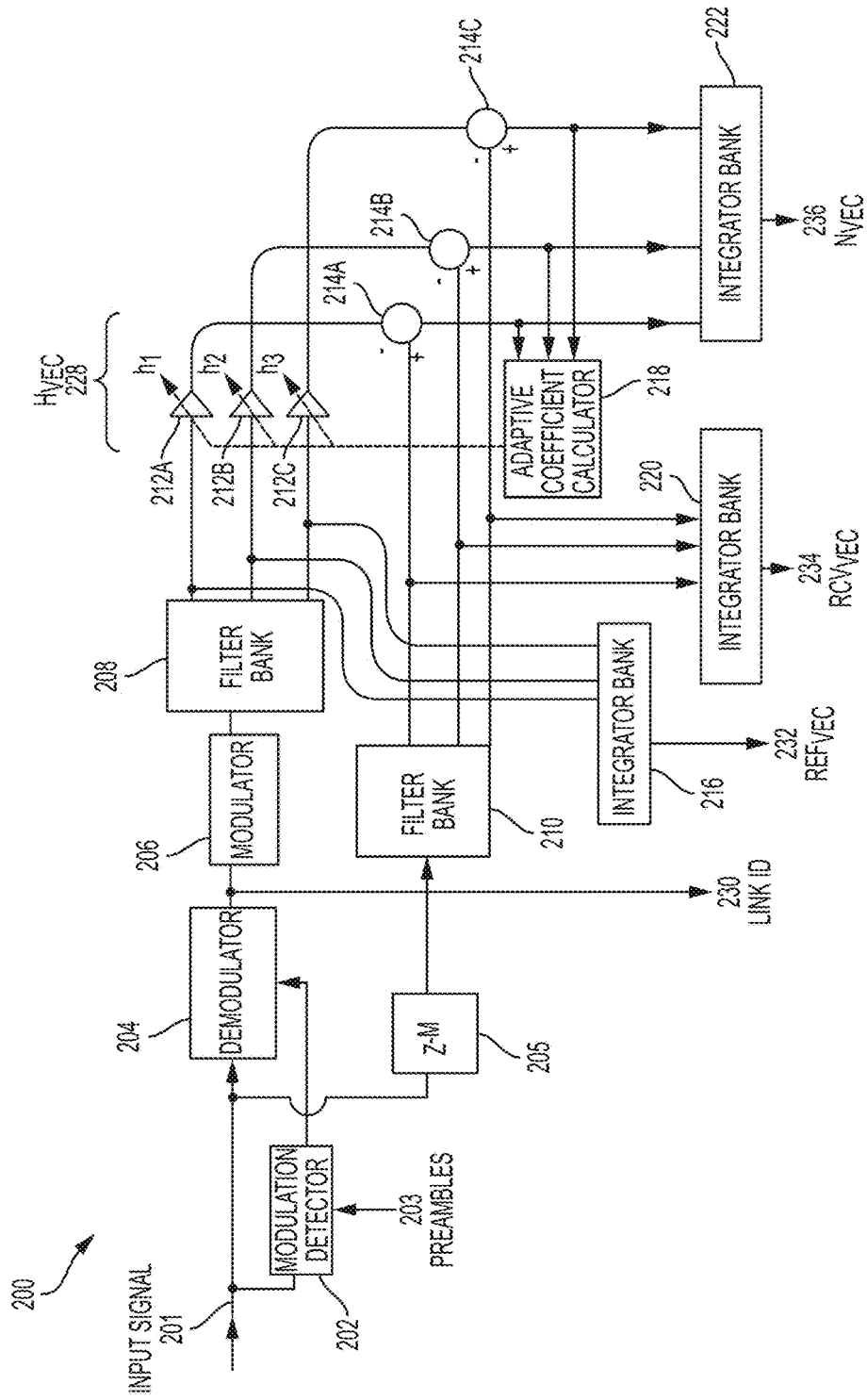
FIG. 2A is a diagram showing example processor circuitry of a motion detector device.
Figure 2B:
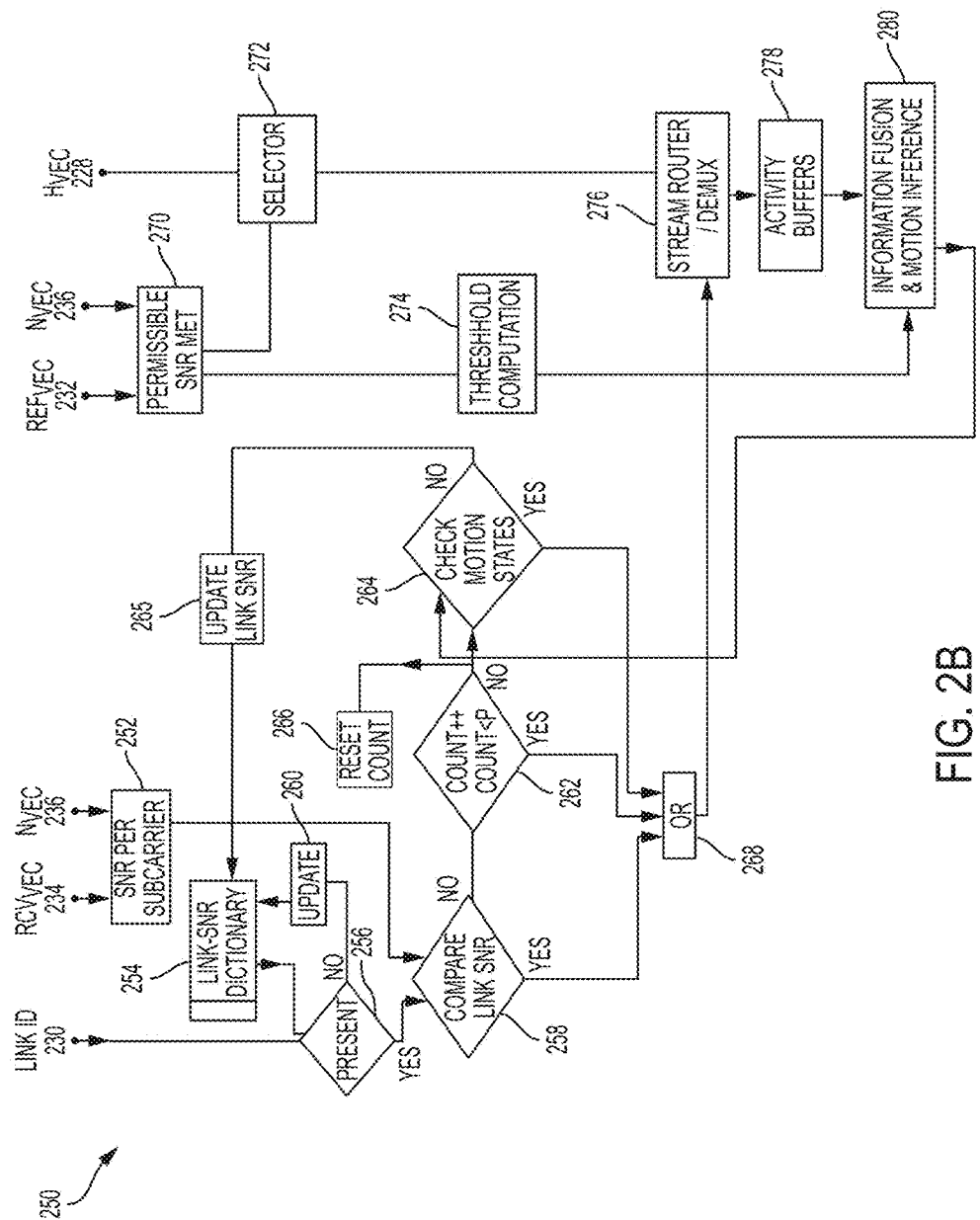
FIG. 2B is a flow chart showing an example process for detecting motion.

In some cases, a communication channel for a wireless signal can include multiple paths for a transmitted wireless signal. For a given communication channel (or a given path in a communication channel), the transmitted signal from a transmitter device (e.g., the wireless access points 102A, 102B) can be reflected off or scattered by surfaces in the communication channel. In some cases, reflection, scattering or other effects on the transmitted signal can be characterized as a channel response. In some cases, the channel response can be determined by processing the received signal at the motion detector device 104. For instance, the channel response can be determined as shown in FIG. 2A or otherwise. When an object moves in the communication channel, the effects on the transmitted signal in the communication channel change, and hence, the channel response of the communication channel can also change. Accordingly, a changed detected in the channel response can be indicative of movement of an object within the communication channel. In some cases, channel responses can be processed for motion detection as shown in FIG. 2B or otherwise. In some instances, noise, interference or other phenomena can influence the channel response detected by the receiver, and the motion detection system can account for such influences to improve the accuracy and quality of motion detection capabilities.

Figure 1B:
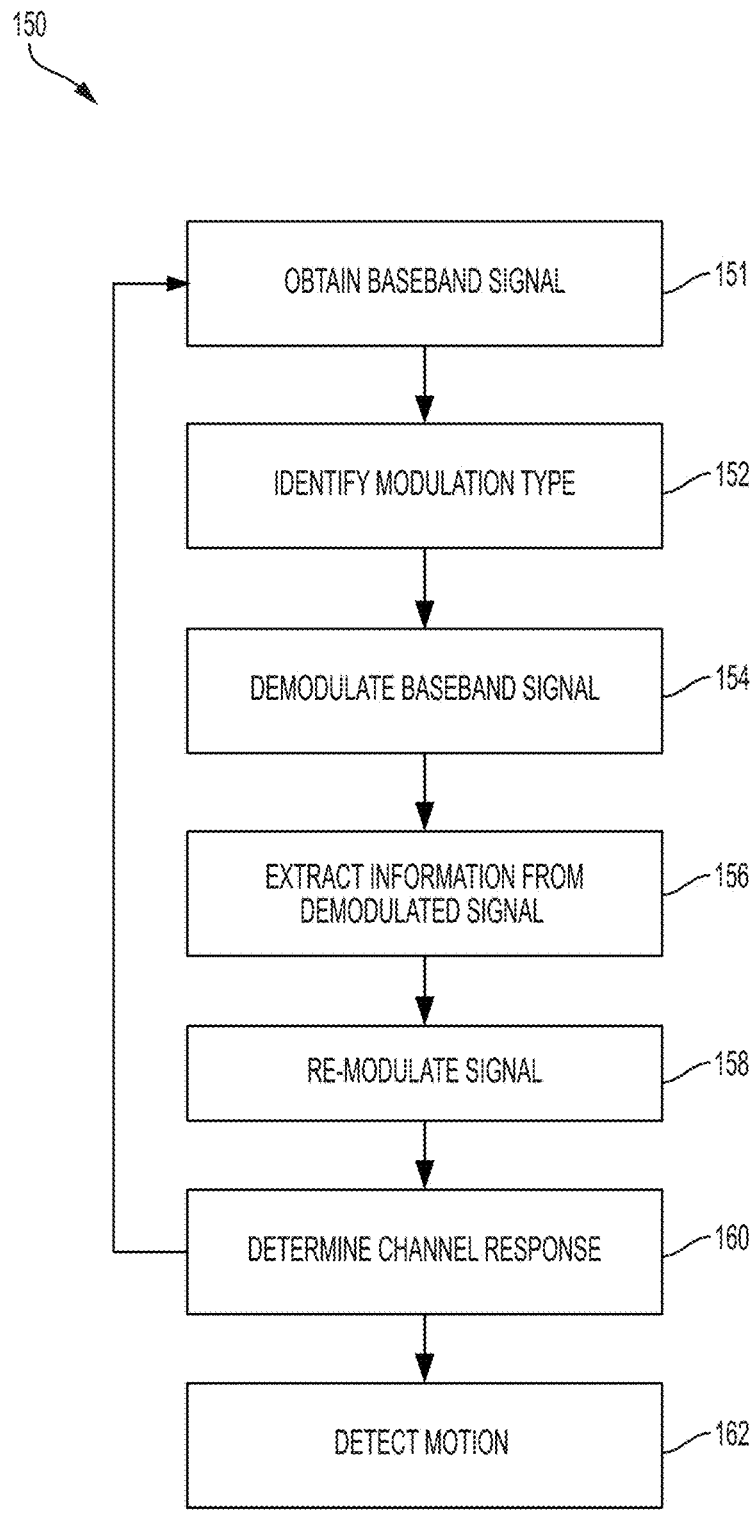
FIG. 1B is a flow chart showing an example process for detecting motion.

FIG. 1B is a flow chart showing an example process 150 for detecting motion. The example process 150 can be performed, for example, by a motion detector device the receives wireless signals from one or more transmitter devices. For instance, operations in the process 150 may be performed by the motion detector device 104 shown in FIG. 1A based on wireless signals received from one or both of the wireless access points 102A, 102B. The example process 150 may be performed by another type of device, based on wireless signals from another type of transmitter device. The example process 150 may include additional or different operations, and the operations may be performed in the order shown or in another order. In some cases, one or more of the operations shown in FIG. 1B are implemented as processes that include multiple operations, sub-processes or other types of routines. In some cases, operations can be combined, performed in another order, performed in parallel, iterated or otherwise repeated or performed another manner.

At 151, a baseband signal (a first signal) is obtained. The baseband signal is based on a wireless signal transmitted through a space by a transmitter device (e.g., a wireless access point or another type of wireless network device) and received by a motion detector device. The wireless signal can be, for example, a radio frequency signal, and the baseband signal can be produced by a radio subsystem processing (e.g., down-converting, filtering, etc.) the radio frequency signal. The baseband signal can be obtained at a baseband processor, for example, from the radio subsystem in digital or analog format. The baseband signal can be a digital signal that includes in-phase and quadrature signal components (I and Q signals).

At 152, a modulation type of the baseband signal is identified. For example, the modulation type can be identified by the modulation detector 202 shown in FIG. 2A. The modulation type of the baseband signal is one of multiple distinct modulation types that can be identified by the motion detector device. The distinct modulation types may include, for example, orthogonal frequency-division multiplexing (OFDM), direct-sequence spread spectrum (DSSS) and possibly others. In some cases, the modulation type is identified based on information contained in a header, a preamble or another portion of the baseband signal.

At 154, the baseband signal (the first signal) is demodulated to produce a demodulated signal (a second signal). The demodulated signal can be generated by operation of a demodulator (e.g., the demodulator 204 shown in FIG. 2A) demodulating the baseband signal according to the modulation type identified at 152.

At 156, information is extracted from the demodulated signal. The information extracted from the demodulated signal can include, for example, an identifier of the transmitter device. For instance, the demodulator 204 in FIG. 2A can extract a media access control (MAC) address of the wireless access point (or other transmitter device) that transmitted the wireless signal. In some cases, the identifier of the transmitter device is generated by the motion detector device based on the modulation type identified, the MAC address or a combination of these or other data. In some cases, the demodulated signal includes a header and a payload, and information can be extracted from the header. For example, the header may indicate the type of modulation, whether motion was detected by another device in the same communication system, etc.

At 158, the demodulated signal (the second signal) is re-modulated to produce a re-modulated signal (a third signal). The re-modulated signal can be generated by operation of a modulator (e.g., the modulator 206 shown in FIG. 2A) modulating the demodulated signal according to the modulation type identified at 152. In some cases, re-modulating the signal produces a clean version of an original waveform, for example, the original baseband waveform that was converted to the wireless signal transmitted by the transmitter device. Accordingly, differences between the re-modulated signal produced at 158 and the baseband signal obtained at 151 may be attributable to wireless transmission, and the signals may be processed to analyze the wireless communication channel.

At 160, a channel response is determined. In some cases, the channel response can be interpreted as a filter representation of the wireless communication channel. The channel response can be determined based on the baseband signal (the first signal), the re-modulated signal (the third signal) and possibly other signals or information. In some implementations, a first set of frequency components are determined from the baseband signal, for example, by the filter bank 210 shown in FIG. 2A; a second set of frequency components are determined from the re-modulated signal, for example, by the filter bank 208 shown in FIG. 2A. In some implementations, a third set of frequency components are determined by applying channel response values to the second set of frequency components, and the third set of frequency components can be used to determine error values. For example, the tunable filters 212A, 212B, 212C shown in FIG. 2A can modify the output of the filter bank 208 to produce the third set of frequency components, and the error detectors 214A, 214B, 214C can determine the error values from the first and third sets of frequency components. The channel response can be determined based on the error values, for example, by the adaptive coefficient calculator 218 shown in FIG. 2A. The channel response may be determined in another manner or by other types of hardware components or processes.

As shown in FIG. 1B, channel responses can be determined for multiple baseband signals. For instance, the motion detector device may receive a sequence of two, three, four or more wireless signals, convert the wireless signals to respective baseband signals, and determine a channel response for each respective baseband signals as shown in FIG. 1B. The operations 151, 152, 154, 156, 158, 160 can be performed for each respective wireless signal received by a motion detector device over time. For example, when a second wireless signal is received, another baseband signal (a fourth signal) can be produced from the second wireless signal. The baseband signal can be demodulated (at 154) to produce another demodulated signal (a fifth signal), and the demodulated signal can be re-modulated (at 158) to produce another re-modulated signal (a sixth signal). A second channel response can then be determined for the second wireless signal based on the corresponding baseband signal (the fourth signal) and the corresponding re-modulated signal (the sixth signal).

At 162, motion is detected based on the channel response. For instance, motion of an object in the space accessed by multiple wireless signals over a time period can be detected based on the channel responses generated from the wireless signals. In some cases, changes in the channel responses over time are analyzed, and significant changes can be interpreted as an indicator of movement in the space accessed by the wireless signals.

In some implementations, channel responses from multiple transmitter devices are used to detect a location or relative proximity of the motion at 162. For example, a second channel response can be determined from a second wireless signal transmitted through a space by a second transmitter device. In some instances, proximity of the object can be determined based on the first and second channel responses. The proximity may be determined, for example, as discussed with respect to FIGS. 3, 4 and 5 or in another manner. In some cases, the proximity of an object's motion is determined relative to another object, relative to a transmitter device, relative to a motion detector device, or relative to another reference.

In some implementations, motion data, noise data or other information generated by the process 150 are further analyzed or otherwise processed. For example, the motion data may be processed by the motion detector device, a server or another type of system. The motion data may include, for instance, an indication that motion has been detected. The motion data may indicate a time when motion was detected, an identity of a device that detected motion, a location of the detected motion, etc. In some cases, the motion data are processed as part of a security protocol, for example, to determine whether security has been breached. In some cases, the motion data are processed as part of a power management protocol, for example, to determine whether lights, HVAC, security systems (e.g., door locks) or other systems should be activated or deactivated.

FIG. 2A is a diagram showing example processor circuitry 200 of a motion detector device. For instance, the processor circuitry 200 shown in FIG. 2A can be included in the processor subsystem 114 of the example motion detector device 104 shown in FIG. 1A. The processor circuitry 200 shown in FIG. 2A is configured to determine channel responses based on digital baseband signals generated from wireless signals. For instance, the input signal 201 in FIG. 2A can be the baseband signal obtained (at 151) in the process 150 shown in FIG. 1B, and the channel response ($H_{VEC}$) 228 in FIG. 2A can be the channel response generated (at 160) in FIG. 1B.

As shown in FIG. 2A, the processor circuitry 200 receives inputs that include the input signal 201 and preambles 203, and the processor circuitry 200 produces outputs that include the channel response ($H_{VEC}$) 228, a link identifier 230, a reference vector ($Ref_{VEC}$) 232, a received vector ($Rcv_{VEC}$) 234 and a noise vector ($N_{VEC}$) 236. In some cases, the processor circuitry 200 may receive additional or different inputs, produce additional or different outputs, or both.

The input signal 201 can be a digital baseband signal. For instance, the input signal 201 can be a baseband signal that has produced by a radio subsystem down-converting, filtering and digitizing a radio frequency wireless signal. The input signal 201 can include in-phase and quadrature signal components (I and Q signals).

The preambles 203 includes a list of various wireless network preambles. For example, the preambles 203 can include a list of Wi-Fi preambles for different Wi-Fi network standards. The preambles 203 can be stored in a local memory that is accessible to the processor circuitry 200.

The link identifier 230 can be an identifier of a transmitter device that transmitted the wireless signal. The link identifier 230 can be, for example, the Media Access Control (MAC) address of a wireless access point or other network device that transmitted the wireless signal that is processed by the processor circuitry 200. In some cases, the link identifier 230 can be another type of unique address or identifier associated with a transmitter device.

The channel response ($H_{VEC}$) 228, the reference vector ($Ref_{VEC}$) 232, the received vector ($Rcv_{VEC}$) 234 and the noise vector ($N_{VEC}$) 236 are all vector objects that are produced by processing the input signal 201 in the frequency domain. In some cases, each vector object is an array of complex numbers, where each complex number has two components (e.g., real and imaginary components, or amplitude and phase components). Each of the vector objects has three components as illustrated in FIG. 2A, but the vector objects will typically include many tens or hundreds of components. In the example shown, all of the vector objects have the same number of components; in some cases, one or more of them may have a different number of components.

The example processor circuitry 200 shown in FIG. 2A includes a modulation detector 202, a demodulator 204, a time delay ($Z^{-M}$) 205, a modulator 206, filter banks 208, 210, tunable filters 212A, 212B, 212C, error detectors 214A, 214B, 214C, an adaptive coefficient calculator 218, and integrator banks 216, 220, 222. The tunable filters 212A, 212B, 212C, error detectors 214A, 214B, 214C and adaptive coefficient calculator 218 can be configured to operate collectively, for example, as an adaptive filter in some instances. In some cases, one or more of the components shown in FIG. 2A may be implemented in programmable logic (e.g., a field programmable gate array (FPGA) with a core instantiated thereon, or another type of programmable logic), a general purpose processor or digital signal processor (DSP), an application specific integrated circuit (ASIC) or the like, or a combination thereof. The processor circuitry in a motion detector device may include additional or different components.

The example modulation detector 202, can identify a type of modulation applied to the original waveform transmitted by the transmitter device. For example, the modulation detector 202 may detect a wireless network standard that was used to transmit the wireless signal, and identify the modulation type based on the wireless network standard. In some cases, the modulation detector correlates the preamble of the input signal against the stored preambles 203 to detect the wireless network standard. In some instances, the modulation type identified by the modulation detector 202 is orthogonal frequency-division multiplexing (OFDM), for example, based on detecting wireless signals transmitted according to the 802.11a or 802.11n standards. In some instances, the modulation type identified by the modulation detector 202 is direct sequence spread spectrum (DSSS), for example, based on detecting wireless signals transmitted according to the 802.11b or 802.11c standards. The modulation detector 202 may identify another modulation type (e.g., another modulation type that supports broadband data transmission), and the modulation type may be identified in another manner. As shown in FIG. 2A, the modulation detector 202 receives the input signal 201 and the preambles 203 and provides an identification of the modulation type to the demodulator 204.

The example demodulator 204 can demodulate the input signal 201 according to the modulation type identified by the modulation detector 202. For instance, if OFDM modulation is detected, the demodulator 204 can demodulate the input signal 201 using OFDM demodulation; if DSSS modulation is detected, the demodulator 204 can demodulate the input signal 201 using DSSS demodulation. As shown in FIG. 2A, the demodulator 204 receives the input signal 201 and an identification of the modulation type from the modulation detector 202, and provides a demodulated signal to the modulator 206. The link identifier 230 is extracted from the demodulated signal by the demodulator 204.

The example modulator 206 can modulate the demodulated signal from the demodulator 204 according to the modulation type identified by the modulation detector 202. Thus, the same modulation scheme that was used to generate the wireless signal is used by the modulator 206 to re-modulate the demodulated signal. For instance, if OFDM modulation is detected, the modulator 206 can re-modulate the signal using OFDM demodulation; if DSSS modulation is detected, the modulator 206 can re-modulate the signal using DSSS demodulation. As shown in FIG. 2A, the modulator 206 receives the demodulated signal and an identification of the modulation type from the demodulator 204, and provides a re-modulated signal to the filter bank 208.

The example time delay ($Z^{-M}$) 205 applies a time delay to the input signal 201 before providing the input signal 201 to the filter bank 210. The time delay aligns the beginning of the input signal 201 provided to the filter bank 210 with the beginning of the re-modulated signal provided to the other filter bank 208. Thus, the time delay applied (by operation of the time delay ($Z^{-M}$) 205) accounts for the clock cycles required to demodulate and re-modulate the signal (by operation of the demodulator 204 and modulator 206). As shown in FIG. 2A, the time delay ($Z^{-M}$) 205 receives the input signal 201 and provides a time-delayed copy of the input signal 201 to the filter bank 210.

The example filter banks 208, 210 each produces a set of frequency components based on a time-domain input signal. The filter bank 210 produces a first set of frequency components based on the time-delayed copy of the input signal 201 from the time delay ($Z^{-M}$) 205, and the filter bank 208 produces a second set of frequency components based on the re-modulated signal from the modulator 206. The filter banks 208, 210 can generate the frequency components by effectively applying a fast Fourier transform (FFT) or another type of transformation to the time domain signals. Each of the frequency components produced by the filter bank can be a complex number having a phase and amplitude.

The example filter banks 208, 210 can include a number of prototype low-pass filters shifted in their center frequency. In some cases, a filter bank can be implemented using a combination of windowing and Fourier transforms, or other multi-rate filtering processes. In some cases, each filter bank produces low crosstalk values between filters and defines sharp cut-offs for the filters. As shown in FIG. 2A, the frequency components produced by the filter bank 208 are provided to the tunable filters 212A, 212B, 212C and to the first integrator bank 216, and the frequency components produced by the filter bank 210 are provided to the error detectors 214A, 214B, 214C and to the integrator bank 220.

FIG. 2A shows both filter banks 208, 210 configured to generate three frequency components, but typically a higher number of frequency components will be generated. The number of frequency components can be determined, for example, based on the amount of bandwidth available and the channel granularity utilized. These parameters can be used to tune the range and sensitivity of the motion detector device, for example, in the example process 250 shown in FIG. 2B. In some examples, a 64-point filter bank is used to process a 20 MHz Wi-Fi waveform, with nearly 40 effective bins having significant spectral energy.

The example tunable filters 212A, 212B, 212C can modify the frequency components produced by the filter bank 208, for example, by applying a variable gain to the frequency components. The variable gain applied to the frequency components can be selected according to the output of the adaptive coefficient calculator 218, such that a channel response is applied to the frequency components from the filter bank 208. For example, each component ($h_1$, $h_2$, $h_3$) of a channel response can be provided to a respective one of the tunable filters 212A, 212B, 212C, and each of the tunable filters 212A, 212B, 212C can multiply a respective one of the frequency components by a corresponding component ($h_1$, $h_2$, $h_3$) of the channel response. As shown in FIG. 2A, the tunable filters 212A, 212B, 212C receive the frequency components from the filter bank 208 and provide the modified frequency components to the error detectors 214A, 214B, 214C.

The example error detectors 214A, 214B, 214C can detect differences between the frequency components from the tunable filters 212A, 212B, 212C and the frequency components from the filter bank 210. For example, the frequency components from the filter bank 210 can be received as "set" values and the frequency components from the tunable filters 212A, 212B, 212C can be received as "actual" values for the respective error detectors 214A, 214B, 214C. Each of the error detectors 214A, 214B, 214C can produce a respective error value from the "actual" and "set" values, for example, by subtracting the "actual" value from the "set" value. The error values from the error detectors 214A, 214B, 214C can be provided to the adaptive coefficient calculator 218 and the third integrator bank 222.

The adaptive coefficient calculator 218 can compute a channel response based on the error values from the error detectors 214A, 214B, 214C. The adaptive coefficient calculator 218 can integrate the error values to compute an instantaneous coefficient for the tunable filters 212A, 212B, 212C. In the example shown, the error values are computed based on the input signal 201 frequency components (generated by the filter bank 210) and the re-modulated signal frequency components (generated by the filter bank 208) as modified by the tunable filters 212A, 212B, 212C. The example adaptive coefficient calculator 218 can define a filter transfer function and a cost function, and use an adaptive process (e.g., an optimization process) to modify the filter transfer function towards reducing or minimizing the cost function. In the example shown, the channel response is computed in the frequency domain. In the frequency domain, a channel can be represented as a complex scalar which multiplies the frequency content from a particular sub-band and subsequently adds the outputs of all sub-band channels to capture the response of the signal passing through the channel. The adaptive coefficient calculator 218 can minimize (or otherwise reduce) the error between the actual and predicted output of each sub-band using an error minimization technique. The error minimization technique can include an adaptive coefficient update technique such as, for example, Least Mean Squares (LMS), Recursive Least Squares (RLS), Affine LMS, Batch Least Squares (BLS), or another technique.

The integrator banks 216, 220, 222 can integrate the various frequency components that they receive over time and produce a vector of integrated frequency components. For example, the motion detector device can receive a series of wireless signals and produce a set frequency components, a channel response and error values from each wireless signal; the first integrator bank 216 can integrate the sets of frequency components from the filter bank 208 over time, the second integrator bank 220 can integrate the sets of frequency components from the filter bank 210 over time, and the third integrator bank 222 can integrate the error values from the error detectors 214A, 214B, 214C over time. The integrator banks 216, 220, 222 can integrate over time, for example, to average out noise or random effects. As shown in FIG. 2A, the first integrator bank 216 produces the reference vector (Ref$_{VEC}$) 232 by integrating the values that it receives, the second integrator bank 220 produces the received vector (Rcv$_{VEC}$) 234 by integrating the values that it receives, and the third integrator bank 222 produces the noise vector (N$_{VEC}$) 236 by integrating the values that it receives.

In some aspects of operation, the input signal 201 is passed to the modulation detector 202, and the modulation detector 202 correlates the input signal 201 against Wi-Fi preambles. If a valid modulation type is identified by the modulation detector 202, the demodulator 204 demodulates and decodes the bits of the input signal 201. Complete mapping to bit is not necessary. For example, the demodulator 204 may generate symbols that can be translated to the raw I/Q waveform using reverse processes. The demodulator 204 also generates a unique ID based on the modulation scheme it discovered, or the unique MAC that the device carried, or a combination of both. The modulator 206 regenerates the modulated waveform, for example, by running the demodulator backwards. The modulator 206 can use a simplified modulation process. For example, the modulator 206 may skip a part of the packet (e.g., a part that has advanced MIMO transmission) and use the simple backward compatibility header part of the waveform. If a signal does not have a high enough signal-to-noise ratio for most of the bits or symbols to be generated correctly (low bit-error-rate), the modulator 206 can use the preamble or training signals to generate the modulated waveform, and such preamble or training signals are typically known for each standard. In some cases, no significant penalty is observed in the system for low bit-errors.

In some aspects of operation, after the modulator 206 has used the symbols or bits from the demodulator 204 to generate a modulated waveform, the modulated waveform from the modulator 206 is passed through the filter bank 208. The input signal 201 is also passed through the filter bank 210 with a delay (applied by the time delay 205) to account for the processing delay in generating modulated waveform. The filter banks 208, 210 generate multiple frequency channels, for example, dividing their respective input signals into frequency components. In some cases, only a subset of frequency channels have good spectral content. The subset of channels can be selected, for example, by looking at the spectral properties of the signal. In some cases, the frequency components from the filter banks are processed by a decimator (not shown) to limit the data rate appropriately. For instance, when most of the spectral content has been removed except a small band of energy within the passband, the signals are rate adjustable. The output of the filter bank 208 is taken as an individual channel, whose components are multiplied by complex multipliers (h$_1$, h$_2$, h$_3$) to match the components from the other filter bank 210. The signals generated by the filter banks 208, 210 and the error detectors 214A, 214B, 214C can be integrated and provided for use in a motion detection process. The signals generated by the adaptive coefficient calculator 218 can also be provided for use in the motion detection process.

FIG. 2B is a flow chart showing an example process 250 for detecting motion. The example process 250 can be used to detect motion based on channel responses. For instance, operations in the example process 250 may be performed by the processor subsystem 114 of the example motion detector device 104 in FIG. 1A to detect motion of the person 106 (or another type of object) based on channel responses derived from wireless signals from one or both of the wireless access points 102A, 102B. The example process 250 may be performed by another type of device. The example process 250 may include additional or different operations, and the operations may be performed in the order shown or in another order. In some cases, one or more of the operations shown in FIG. 2B are implemented as processes that include multiple operations, sub-processes or other types of routines. In some cases, operations can be combined, performed in another order, performed in parallel, iterated or otherwise repeated or performed another manner.

As shown in FIG. 2B, the process 250 operates based on inputs received from the processor circuitry 200 shown in FIG. 2A. In particular, the process 250 uses the link identifier 230, the channel response (H$_{VEC}$) 228, the reference vector (Ref$_{VEC}$) 232, the received vector (Rcv$_{VEC}$) 234 and the noise vector (N$_{VEC}$) 236. In some cases, the process 250 may receive or utilize additional or different inputs or stored information.

The example process 250 also uses a link-SNR dictionary 254. The link-SNR dictionary 254 can be a list or another type of database, for example, stored in a memory of the motion detector device. The link-SNR dictionary 254 includes information about communication links (e.g., between the motion detector device and transmitter devices) that are used to detect motion. For instance, the link-SNR dictionary 254 can include identifiers for the respective communication links such as, for example, the modulation type used by the communication link, the MAC address of the transmitter device, the MAC header of the wireless signals, or other identifiers. In some cases, the link-SNR dictionary 254 includes physical layer profiles for each communication link such as, for example, the signal-to-noise ratio (SNR) of the received vector (Rcv$_{VEC}$) 234 for each subcarrier index of each communication link. The subcarrier indices of a communication link correspond to the frequency components of the signals transferred on the communication link (e.g., the frequency components produced by the filter banks 208, 210 in FIG. 2A). The identifiers in the link-SNR dictionary 254 can be used to separate the communication links into motion streams from which motion information can be gleaned.

In some cases, the link identifier 230, the received vector (Rcv$_{VEC}$) 234 and the noise vector (N$_{VEC}$) 236 are used to create signatures for the respective communication links, and the signature for each communication link can be stored in the link-SNR dictionary 254. For example, over time periods when there are no significant changes in a Wi-Fi link, the signature of the Wi-Fi link may indicate certain unique, static properties of the Wi-Fi link. In some cases, a single transmitter device (e.g., a single Wi-Fi access point) can have multiple distinct signatures. For example, the transmitter device may use two distinct modulation schemes intermittently, and the two modulation schemes may have different distributions of spectral energy, above the noise, which results in two unique signatures.

At 252, the received vector ($\text{Rcv}_{VEC}$) 234 and the noise vector ($\text{N}_{VEC}$) 236 are used to determine the signal-to-noise ratio (SNR) of the received vector ($\text{Rcv}_{VEC}$) 234 for each subcarrier index. At 256, the link identifier 230 is checked against the link-SNR dictionary 254 to determine whether the link identifier 230 is present in the link-SNR dictionary 254, and if so, which existing communication link the link identifier 230 corresponds to. At 260, the link-SNR dictionary 254 is updated if the link identifier 230 was not present in the link-SNR dictionary 254. If the link identifier 230 was present in the link-SNR dictionary 254, then at 258, the SNR determined at 252 is compared to the SNR stored in the link-SNR dictionary 254 for the link identifier 230. If the SNR of the received vector ($\text{Rcv}_{VEC}$) 234 (determined at 252) matches the SNR stored in the link-SNR dictionary 254 within a certain tolerance, then the communication link signature corresponding to the link identifier 230 is passed from the link-SNR dictionary 254 to a stream router or de-multiplexer, to be processed at 276. If the SNR of the received vector ($\text{Rcv}_{VEC}$) 234 (determined at 252) does not match the SNR stored in the link-SNR dictionary 254 within tolerance, but the link identifier 230 was found in the link-SNR dictionary 254, a count is incremented at 262, and the communication link signature is passed to the stream router or de-multiplexer if the count value is less than a threshold value (P). If the count value is not less than the threshold value (P) at 262, then the count is reset at 266, and the motion status is checked at 264. If it is determined at 264 that no motion has been detected, then the link-SNR dictionary 254 is updated at 265, to account for changes in the communication link. If it is determined at 264 that motion has been detected, then the communication link signature is passed to the stream router or de-multiplexer. The count increment and threshold comparison at 262 is used to account for significant changes in a communication channel accompanying activity in close proximity to the transmitter device or the motion detector system. In such cases, the link-SNR dictionary 254 is updated at 265 to account for the communication link being altered by the moving object.

The SNR of the received signal can be used to determined which channel response components have sufficient spectral energy to qualify for motion detection. This determination can prevent or reduce the effect of out-of-band channel interferes impeding with the packet or destroying some of the subcarriers (e.g., owing to overlap in Wi-Fi bands or other factors). At 270, the reference vector ($\text{Ref}_{VEC}$) 232 and the noise vector ($\text{N}_{VEC}$) 236 are used to determine which subcarrier indices have sufficient signal-to-noise ratio (SNR) for motion detection. The channel response ($\text{H}_{VEC}$) 228 contains channel response components for all subcarrier indices. At 272, the channel responses components for the subcarrier indices having sufficient SNR are selected and passed to the stream router or de-multiplexer to be processed at 276. At 274, a threshold is computed based on the SNR; the threshold can be used at 280, for example, to determine the proximity of motion.

At 276, the selected channel response components from 272 are passed through a stream router or de-multiplexer programmed by the channel signature from the link-SNR dictionary 254. The router or de-multiplexer routes the channel signature to a unique link queue, for example, so that a change detection algorithm can make use of successive channel responses to determine motion perturbations in close proximity to that link. Each link queue can accumulate channel responses from a separate unique link (or in some cases from a separate transmitter/receiver pair, if each link has multiple transmitter/receiver pairs). The router or de-multiplexer can be driven by multiple inputs and multiple logical constraints. In some implementations, each link can have a unique identifier, and the identifier can be used to route the channel response. The unique identifier for each link may be acquired through a preamble of a transmission, or an identifier generated by the closest previous channel may be used.

At 278, the stream router or de-multiplexer sends the channel components for the appropriate channel indices from the channel response ($\text{H}_{VEC}$) 228 to the respective activity buffers. The activity buffers function as a queue system, containing separate buffers for each communication link. When a valid channel response gets added to the activity buffers, a change detection algorithm can be performed to determine the extent of change in the communication channel, for example based on prior channel responses. In some cases, the change detection algorithm can distinguish a change created from motion of objects, for example, form ambient noise present in the estimation of the channel response. In some examples, two running windows are used to compute variance on entries within the queue; one is a long-term window and the other is the short-term window. The long-term window computes the average noise variance of the estimator, while the short-term window operates over a smaller interval of samples and computes the short-term variance of elements within the window. If the estimated variance for both the windows does not exceed a threshold, then it can be assumed that the channel variance is caused by the ambient noise of the estimator. If the computed results from two windows diverges beyond the threshold, then the channel variance can be ascribed to motion in the proximity of the link. Other techniques can be used for change detection in some cases.

At 280, information fusion and motion inference are performed. The channel activity can be extracted from each queue, and the information from different links can be fused. The fusion of information from different links can be performed, for example, using statistical methods. In some examples, the motion indication metric on each link can be weighted by the quality of the link. The weighted indication metrics can then be summed and normalized (e.g., by the number of links) to create a fused metric for the overall indication. The quality of link can be determined based on information such as, for example, the aggregate SNR for all the sub-carriers, the SNR of the weakest carrier, the SNR of the strongest carrier, or another computed value. The quality measure can be determined, for example, based on a desired sensitivity of the motion detection device, a desired probability of false alarms or other factors. In some cases, the link having the lowest SNR will have the lowest overall impact on the fused motion indicator, for instance, by having the lowest weighting value. In some cases, the extraction of motion information, and link proximity indication that ties it to a particular link can be performed as described with respect to FIGS. 3, 4 and 5.

Figure 3:
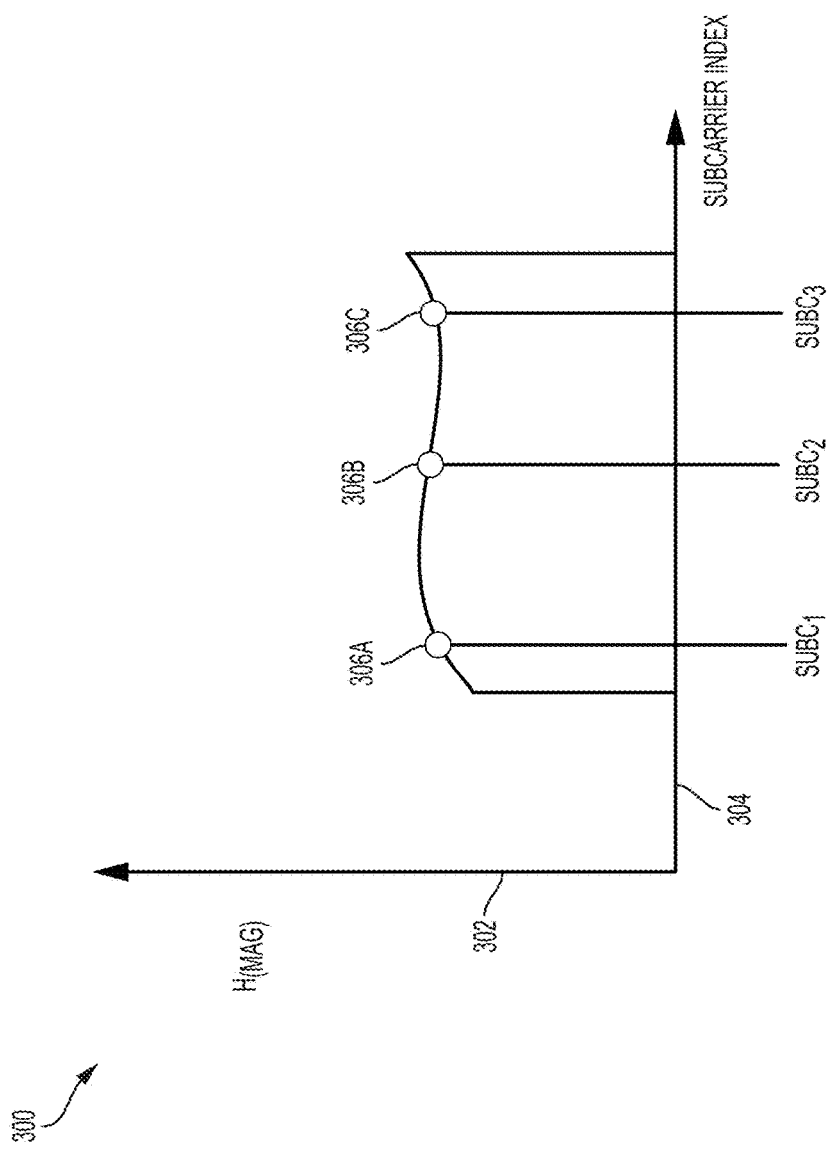
FIG. 3 is a plot showing example channel response data.

FIG. 3 is a plot 300 showing example channel response data. The plot 300 includes a vertical axis 302 representing a range of values for $\text{H}_{(MAG)}$, the magnitude of channel response components. The plot 300 also includes a horizontal axis 304 representing a range of subcarrier indices for channel responses. Each subcarrier index corresponds to a respective component of the channel response. The plot 300 includes a first channel response component magnitude (subc$_1$) 306A, a second channel response component magnitude (subc$_2$) 306B, and a third channel response component magnitude (subc$_3$) 306C. The channel response component magnitudes 306A, 306B, 306C can represent the amplitudes of three components of the channel response (H$_{VEC}$) 228 shown in FIGS. 2A, 2B.

In some implementations, channel responses (e.g., like the channel response (H$_{VEC}$) 228 shown in FIGS. 2A, 2B) collected from a number of wireless transmissions (e.g., multiple data packets), can be used to detect physical perturbations in the environment probed by the wireless transmissions. In some cases, a motion detector device can be used to derive motion metrics that exhibit different sensitivities to the surrounding activities, or different sensitivities to changes in the communication channel. This sensitivity difference can be exploited to generate information about the proximity of the disturbance to the individual link. For example, the channel response component magnitudes 306A, 306B, 306C shown in the plot 300 can have the following properties:

$$\int subc_1 subc_2 dt \propto a \int |\nabla H_{VEC}|;$$

$$\int subc_1 subc_3 dt \propto b \int |\nabla H_{VEC}|;$$

$$a < b.$$

In the right-hand side of equations above, the integral of $|\nabla H_{VEC}|$ can be interpreted as a total variation of $H_{VEC}$ within an existing buffer. The left-hand side of the equations above can be interpreted as the correlation of the channel response components for the two subcarrier indices. In the equations above, the correlation of subc$_1$ and subc$_2$ is a function of total variation in the channel. In such cases, subc$_1$ is correlated with subc$_2$ if the channel perturbation is low; but when the channel perturbation grows, their correlation is affected. The proportionality constants (a, b) for the two correlations are different (here, a<b). Accordingly, a motion detector device can have different sensitivities to perturbations. In this example, since the magnitude of perturbations is directly correlated to the proximity of the disturbance to the link, metrics can be developed to exploit this difference. An example is shown in FIG. 4.

Figure 4:
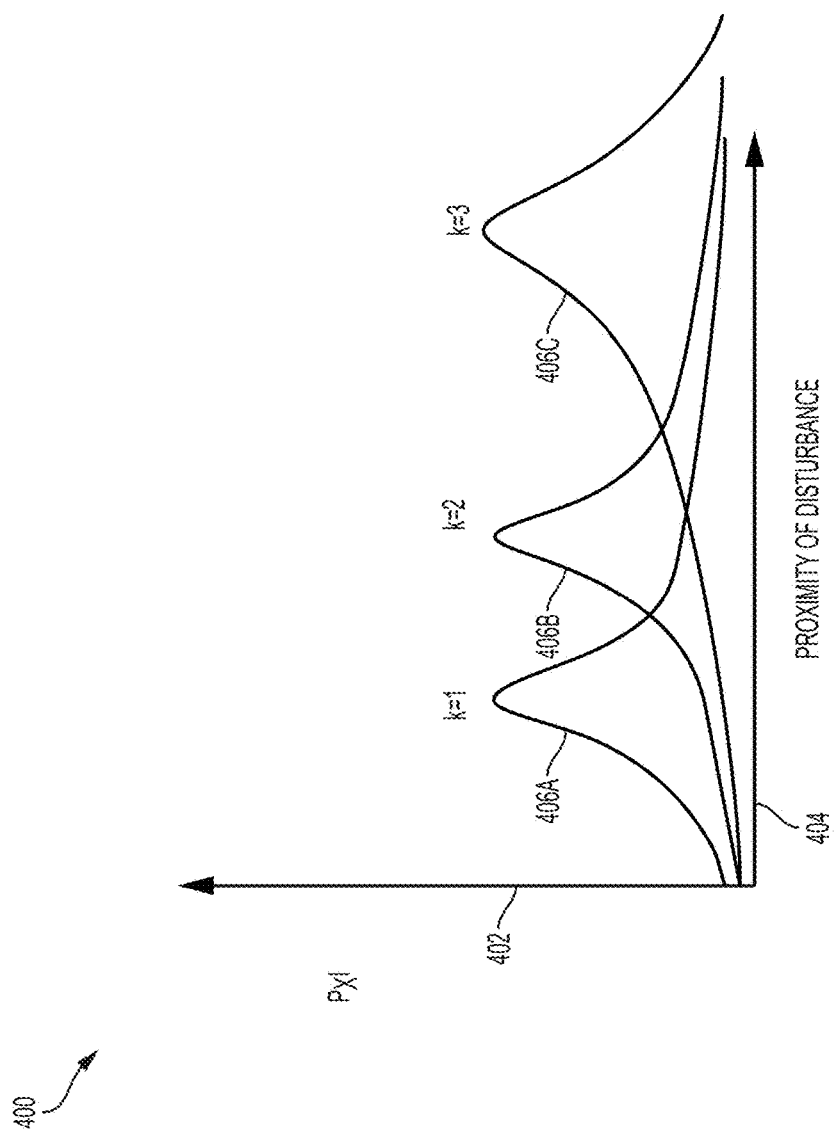
FIG. 4 is a plot showing example proximity data.

FIG. 4 is a plot 400 showing example proximity data. The plot includes a vertical axis 402 representing a range of values for the quantity Pxl. The plot also includes a horizontal axis 404 showing a range of distances for the proximity of disturbance. The quantity Pxl can be computed for a subcarrier index separation k, where $$Pxl_k = \text{Variance} \left[ \frac{subc_i(n)}{subc_{i+k}(n)} \right]_{n=n_0}^{n=m_0}$$

In the equation above, the quantity Pxl represents a measure of proximity of disturbance to a communication link. The quantity Pxl$_k$ for the subcarrier index separation k is obtained by taking the ratio of the channel response component magnitude for subcarrier index i over the channel response component magnitude for subcarrier index i+k over a certain time window of n$_0$ to m$_0$, and then taking the variance of the whole array. The example curves 406A, 406B, 406C shown in the plot 400 demonstrate an example of how the quantity Pxl may behave as a function of k. In the example shown, as k increases, the quantity Pxl based on k peaks at a different proximity of disturbance. In some cases, the peak can be established, for example, through an initial training period, and then used as a threshold to determine proximities of disturbances to the particular wireless link.

Figure 5:
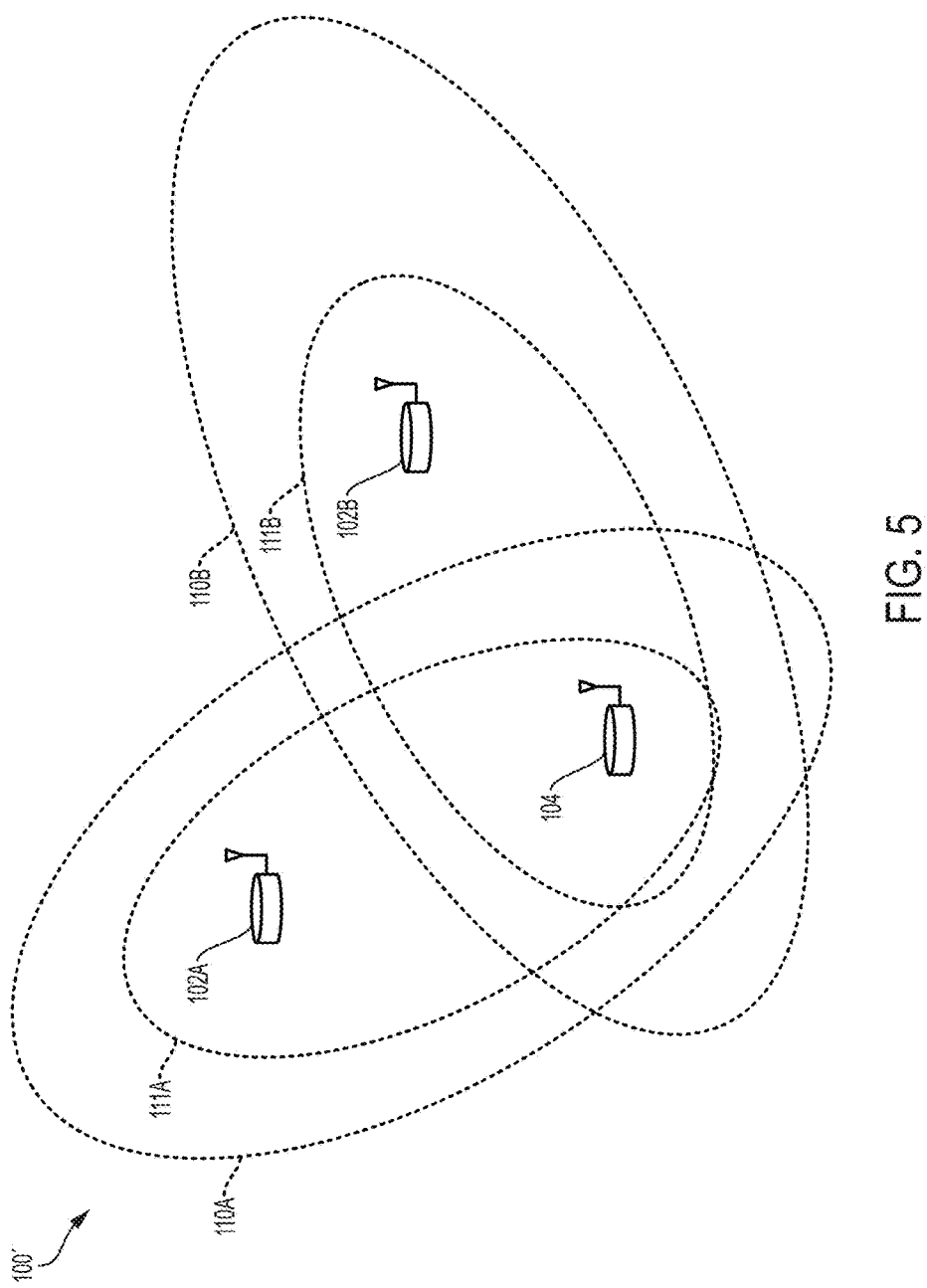
FIG. 5 is a diagram showing an example wireless communication system.

FIG. 5 is a diagram showing an example wireless communication system 100'. The example wireless communication system 100' shown in FIG. 5 is the wireless communication system 100 shown in FIG. 1A with additional motion detection fields 111A, 111B shown in the figure. In some cases, motion in the inner and outer motion detection fields 110A, 111A can be distinguished from one another based on signals transferred on the communication link between the motion detector device 104 and wireless access point 102A; similarly, motion in the inner and outer motion detection fields 110B, 111B can be distinguished from one another based on signals transferred on the communication link between the motion detector device 104 and the wireless access point 102B.

In the example shown in FIG. 5, the motion detector device 104 is sensitive to near and far proximities for both communication links shown. For instance, the quantities Pxl$_k$ shown in FIG. 4 can be used to extract information about the proximity of disturbance, and the inner and outer motion detection fields for each communication link can be distinguished based on the detected proximity of disturbance. In some cases, information about the area surrounding a communication link, as well any perturbations directly appearing within proximity of the communication link at different proximity locations can be used, for example, to determine the approximate location of a moving object.

In a general aspect of the examples described, motion is detected based on wireless signals.

In a first example, a modulation type of a first signal is identified at a motion detector device. The first signal is based on a wireless signal that has been transmitted through a space by a transmitter device and received by the motion detector device. By operation of a demodulator at the motion detector device, a second signal is generated from the first signal, by demodulating the first signal according to the identified modulation type. By operation of a modulator at the motion detector device, a third signal is generated from the second signal, by modulating the second signal according to the identified modulation type. A channel response is determined based on the first signal and the third signal. The channel response is used to detect motion of an object in the space.

Implementations of the first example may, in some cases, include one or more of the following features. A first set of frequency components can be determined from the first signal, and a second set of frequency components can be determined from the third signal. By operation of an adaptive coefficient calculator at the motion detector device, the channel response can be determined based on the first and second sets of frequency components. A third set of frequency components can be determined by modifying the first set of frequency components. Error values can be determined from the first set of frequency components and the third set of frequency components. An adaptive coefficient calculator can determine the channel response based on the error values. Signal-to-noise ratios (SNRs) for frequency components of the first signal can be determined. Components of the channel response can be selected based on the signal-to-noise ratios, and the selected components of the channel response can be used to detect motion of the object in the space.

Implementations of the first example may, in some cases, include one or more of the following features. An identifier of the transmitter device can be extracted from the second signal. The identifier can include a media access control (MAC) address of the transmitter device.

Implementations of the first example may, in some cases, include one or more of the following features. The transmitter device can be a first transmitter device, the wireless signal can be a first wireless signal, and the channel response can be a first channel response. A second channel response can be determined based on a second wireless signal that has been transmitted through the space by a second transmitter device and received by the motion detector device. Proximity of the object can be determined based on the first and second channel responses.

Implementations of the first example may, in some cases, include one or more of the following features. The wireless signal can be a radio frequency signal transmitted by a wireless network device, and the first signal can be a baseband signal produced by a radio subsystem at the motion detector device processing the radio frequency signal. Identifying the modulation type can include identifying a first modulation type from a plurality of distinct modulation types. The plurality of distinct modulation types can include orthogonal frequency-division multiplexing (OFDM) and direct-sequence spread spectrum (DSSS).

Implementations of the first example may, in some cases, include one or more of the following features. The wireless signal can be a first wireless signal, and the channel response can be a first channel response. By operation of the demodulator, a fifth signal can be generated from a fourth signal. The fourth signal can be based on a second wireless signal that has been transmitted through the space by the transmitter device and received by the motion detector device. The fifth signal can be generated by demodulating the fourth signal. By operation of the modulator, a sixth signal can be generated from the fifth signal, by modulating the fifth signal. A second channel response can be determined based on the fourth signal and the sixth signal. Motion of the object in the space can be detected based on comparing the first and second channel responses.

In a second example, a device includes a modulation detector, a demodulator, a modulator and additional processor circuitry. The modulation detector is configured to identify a modulation type of a first signal. The first signal is based on a wireless signal that has been transmitted through a space by a transmitter device. The demodulator is configured to receive the first signal and generate a second signal from the first signal. The second signal is generated by demodulating the first signal according to the identified modulation type. The modulator is configured to receive the second signal and generate a third signal from the second signal. The third signal is generated by modulating the second signal according to the identified modulation type. The additional processor circuitry is configured to receive the first signal and the third signal and to determine a channel response based on the first signal and the third signal. The additional processor circuitry is configured to detect motion of an object in the space based on the channel response.

Implementations of the second example may, in some cases, include one or more of the following features. The additional processor circuitry can include a first filter bank configured to determine a first set of frequency components from the first signal. The additional processor circuitry can include a second filter bank configured to determine a second set of frequency components from the third signal. The additional processor circuitry can include tunable filters configured to determine a third set of frequency components by modifying the second set of frequency components. The additional processor circuitry can include error detectors configured to determine error values from the first set of frequency components and the third set of frequency components. The additional processor circuitry can include an adaptive coefficient calculator configured to determine the channel response based on the error values. The additional processor circuitry can be configured to determine a signal-to-noise ratios for frequency components of the first signal, select components of the channel response based on the signal-to-noise ratios, and use the selected components of the channel response to detect motion of the object in the space.

Implementations of the second example may, in some cases, include one or more of the following features. The demodulator can be configured to extract a media access control (MAC) address of the transmitter device.

Implementations of the second example may, in some cases, include one or more of the following features. The transmitter device can be a first transmitter device, the wireless signal can be a first wireless signal, and the channel response can be a first channel response. The additional processor circuitry can be configured to determine a second channel response based on a second wireless signal that has been transmitted through a space by a second transmitter device. The additional processor circuitry can be configured to determine proximity of the object based on the first and second channel responses.

Implementations of the second example may, in some cases, include one or more of the following features. The device can include a radio subsystem. The wireless signal can be a radio frequency signal transmitted by a wireless network device, and the first signal can be a baseband signal produced by the radio subsystem processing the radio frequency signal. Identifying the modulation type can include identifying a first modulation type from a plurality of distinct modulation types. The plurality of distinct modulation types can include orthogonal frequency-division multiplexing (OFDM) and direct-sequence spread spectrum (DSSS).

Implementations of the second example may, in some cases, include one or more of the following features. The wireless signal can be a first wireless signal, and the channel response can be a first channel response. The additional processor circuitry can be configured to detect motion of the object in the space based on comparing the first channel response and a second channel response. The second channel response can be based on a second wireless signal transmitted through the space by the transmitter device.

In a third example, a system includes a motion detector device. The motion detector device includes a radio subsystem and a processor subsystem. The radio subsystem is configured to receive wireless signals transmitted through a space by a transmitter device, and to generate respective baseband signals based on the received wireless signals. The processor subsystem is communicably coupled to the radio subsystem and configured to perform operations. The operations include detecting a modulation type of the baseband signals; generating demodulated signals by demodulating the respective baseband signals according to the identified modulation type; generating re-modulated signals by modulating the respective demodulated signals according to the identified modulation type; determining channel responses based on the baseband signals and the re-modulated signals, where each channel response is based on a respective one of the baseband signals and a corresponding one of the re-modulated signals; and using the channel responses to detect motion of an object in the space.

Implementations of the third example may, in some cases, include one or more of the following features. The received wireless signals can be based on respective wireless transmissions by the transmitter device. The motion can be detected based on comparing the channel responses associated with wireless transmissions transmitted by the transmitter device at two distinct times. Identifying the modulation type can include identifying a first modulation type from a plurality of distinct modulation types. The plurality of distinct modulation types can include orthogonal frequency-division multiplexing (OFDM) and direct-sequence spread spectrum (DSSS). The processor subsystem can include a demodulator configured to generate the demodulated signals and a modulator configured to generate the re-modulated signals. The system can include the transmitter device. The transmitter device can be a wireless access point.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A motion detection method comprising:
   identifying a modulation type of a first signal at a motion detector device, the first signal being based on a wireless signal transmitted through a space by a transmitter device and received by the motion detector device;
   by operation of a demodulator at the motion detector device, generating a second signal from the first signal, the second signal being generated by demodulating the first signal according to the identified modulation type;
   by operation of a modulator at the motion detector device, generating a third signal from the second signal, the third signal being generated by modulating the second signal according to the identified modulation type;
   determining a channel response based on the first signal and the third signal; and
   using the channel response to detect motion of an object in the space.

2. The motion detection method of claim 1, comprising:
   determining a first set of frequency components from the first signal;
   determining a second set of frequency components from the third signal; and
   by operation of an adaptive coefficient calculator at the motion detector device, determining the channel response based on the first and second sets of frequency components.

3. The motion detection method of claim 2, comprising:
   determining a third set of frequency components by modifying the first set of frequency components; and
   determining error values from the first set of frequency components and the third set of frequency components; and
   by operation of the adaptive coefficient calculator, determining the channel response based on the error values.

4. The motion detection method of claim 1, comprising:
   determining signal-to-noise ratios for frequency components of the first signal;
   selecting components of the channel response based on the signal-to-noise ratios; and
   using the selected components of the channel response to detect motion of the object in the space.

5. The motion detection method of claim 1, comprising extracting an identifier of the transmitter device from the second signal.

6. The motion detection method of claim 5, wherein the identifier comprises a media access control (MAC) address of the transmitter device.

7. The motion detection method of claim 1, wherein the transmitter device comprises a first transmitter device, the wireless signal comprises a first wireless signal, the channel response comprises a first channel response, and the method comprises:
   determining a second channel response based on a second wireless signal, the second wireless signal transmitted through a space by a second transmitter device and received by the motion detector device; and
   determining a location of the object based on the first and second channel responses.

8. The motion detection method of claim 1, wherein the wireless signal comprises a radio frequency signal transmitted by a wireless network device, and the first signal comprises a baseband signal produced by a radio subsystem at the motion detector device processing the radio frequency signal.

9. The motion detection method of claim 1, wherein identifying the modulation type comprises identifying a first modulation type from a plurality of distinct modulation types.

10. The motion detection method of claim 9, wherein the plurality of distinct modulation types comprises orthogonal frequency-division multiplexing (OFDM) and direct-sequence spread spectrum (DSSS).

11. The motion detection method of claim 1, wherein the wireless signal comprises a first wireless signal, the channel response comprises a first channel response, and the method comprises:
   by operation of the demodulator, generating a fifth signal from a fourth signal, the fourth signal based on a second wireless signal transmitted through the space by the transmitter device and received by the motion detector device, the fifth signal generated by demodulating the fourth signal;
   by operation of the modulator, generating a sixth signal from the fifth signal, the sixth signal generated by modulating the fifth signal;
   determining a second channel response based on the fourth signal and the sixth signal; and
   detecting motion of the object in the space based on comparing the first and second channel responses.

12. The motion detection method of claim 1, wherein the wireless signal comprises a header and a payload, and the modulation type is detected based on information in the header.

13. A device comprising:
   a modulation detector configured to identify a modulation type of a first signal, the first signal based on a wireless signal transmitted through a space by a transmitter device;
   a demodulator configured to receive the first signal and generate a second signal from the first signal, the second signal generated by demodulating the first signal according to the identified modulation type;

a modulator configured to receive the second signal and generate a third signal from the second signal, the third signal generated by modulating the second signal according to the identified modulation type;

processor circuitry configured to receive the first signal and the third signal and to:
  determine a channel response based on the first signal and the third signal; and
  detect motion of an object in the space based on the channel response.

14. The device of claim 13, wherein the processor circuitry comprises:
  a first filter bank configured to determine a first set of frequency components from the first signal;
  a second filter bank configured to determine a second set of frequency components from the third signal.

15. The device of claim 14, wherein the processor circuitry comprises:
  tunable filters configured to determine a third set of frequency components by modifying the second set of frequency components;
  error detectors configured to determine error values from the first set of frequency components and the third set of frequency components; and
  an adaptive coefficient calculator configured to determine the channel response based on the error values.

16. The device of claim 13, wherein the processor circuitry is configured to:
  determine signal-to-noise ratios for frequency components of the first signal;
  select components of the channel response based on the signal-to-noise ratios; and
  use the selected components of the channel response to detect motion of the object in the space.

17. The device of claim 13, wherein the demodulator is configured to extract a media access control (MAC) address of the transmitter device.

18. The device of claim 13, wherein the transmitter device comprises a first transmitter device, the wireless signal comprises a first wireless signal, the channel response comprises a first channel response, and the processor circuitry is configured to:
  determine a second channel response based on a second wireless signal, the second wireless signal transmitted through a space by a second transmitter device; and
  determine a location of the object based on the first and second channel responses.

19. The device of claim 13, further comprising a radio subsystem, wherein the wireless signal comprises a radio frequency signal transmitted by a wireless network device, and the first signal comprises a baseband signal produced by the radio subsystem processing the radio frequency signal.

20. The device of claim 13, wherein identifying the modulation type comprises identifying a first modulation type from a plurality of distinct modulation types, the plurality of distinct modulation types comprising orthogonal frequency-division multiplexing (OFDM) and direct-sequence spread spectrum (DSSS).

21. The device of claim 13, wherein the wireless signal comprises a first wireless signal, the channel response comprises a first channel response, and the processor circuitry is configured to detect motion of the object in the space based on comparing the first channel response and a second channel response, the second channel response based on a second wireless signal transmitted through the space by the transmitter device.

22. A system comprising a motion detector device, the motion detector device comprising:
  a radio subsystem configured to receive wireless signals transmitted through a space by a transmitter device, and to generate respective baseband signals based on the received wireless signals; and
  a processor subsystem communicably coupled to the radio subsystem and configured to perform operations comprising:
    detecting a modulation type of the baseband signals;
    generating demodulated signals by demodulating the respective baseband signals according to the identified modulation type;
    generating re-modulated signals by modulating the respective demodulated signals according to the identified modulation type;
    determining channel responses based on the baseband signals and the re-modulated signals, each channel response based on a respective one of the baseband signals and a corresponding one of the re-modulated signals; and
    using the channel responses to detect motion of an object in the space.

23. The system of claim 22, wherein the received wireless signals are based on respective wireless transmissions by the transmitter device, and the motion is detected based on comparing the channel responses associated with wireless transmissions transmitted by the transmitter device at distinct times.

24. The system of claim 22, wherein identifying the modulation type comprises identifying a first modulation type from a plurality of distinct modulation types, the plurality of distinct modulation types comprising orthogonal frequency-division multiplexing (OFDM) and direct-sequence spread spectrum (DSSS).

25. The system of claim 22, wherein the processor subsystem comprises a demodulator configured to generate the demodulated signals and a modulator configured to generate the re-modulated signals.

26. The system of claim 22, further comprising the transmitter device, wherein the transmitter device comprises a wireless access point.

* * * * *